(12) United States Patent
Ohki

(10) Patent No.: US 6,229,969 B1
(45) Date of Patent: May 8, 2001

(54) IMAGE FORMING APPARATUS AND IMAGE FORMING METHOD WHICH CONTROLS AN IMAGE FORMING CONDITION DEPENDING ON ONE TYPE OF IMAGE FORMING PATTERN

(75) Inventor: Makoto Ohki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,891

(22) Filed: Oct. 25, 1999

(30) Foreign Application Priority Data

Oct. 26, 1998 (JP) ................................. 10-304570

(51) Int. Cl.[7] .................................................. G03G 15/00
(52) U.S. Cl. .................................................. 399/49
(58) Field of Search ................... 399/49, 51, 52, 399/72, 39; 358/521, 458, 300

(56) References Cited

U.S. PATENT DOCUMENTS

| | | | |
|---|---|---|---|
| 5,148,289 | * 9/1992 | Nishiyama et al. | 358/300 |
| 5,305,057 | * 4/1994 | Hattori et al. | 358/519 |
| 5,315,352 | * 5/1994 | Nakane et al. | 399/49 |
| 5,467,195 | * 11/1995 | Mizoguchi | 358/296 |
| 5,579,090 | * 11/1996 | Sasanuma et al. | 399/49 |
| 5,697,012 | * 12/1997 | Sasanuma et al. | 399/49 |

FOREIGN PATENT DOCUMENTS

| | | | |
|---|---|---|---|
| 4-268873 | * 9/1992 | (JP) | . |
| 8-156330 | * 6/1996 | (JP) | . |
| 9-146313 | * 6/1997 | (JP) | . |
| 10-173942 | * 6/1998 | (JP) | . |

* cited by examiner

*Primary Examiner*—Robert Beatty
(74) *Attorney, Agent, or Firm*—Fitzpatrick, Cella, Harper & Scinto

(57) ABSTRACT

It is an object of this invention to provide an image forming apparatus having a plurality of image processing patterns in which to form an image and capable of improving the convenience and reducing the control time. The density variation of a printing pattern is 0.6 times (b/a) that of a photographic pattern. Experiments confirmed that this relationship exhibits substantially the same value even when the change is caused by some other image density characteristic change factor, such as a surrounding environmental change. Therfore, in forming a look-up table on the basis of density information of a gradation control patch, gradation control is so performed that a look-up table for the plurality of printing patterns is formed on the basis of information of a look-up table formed using the photographic pattern.

20 Claims, 9 Drawing Sheets

FIG. 5

|  | P1 | P2 | P3 | P4 | P5 | P6 |
|---|---|---|---|---|---|---|
| INITIAL (PHOTOGRAPHIC PATTERN) | 0.100 | 0.200 | 0.350 | 0.750 | 1.050 | 1.200 |
| ENDURANCE (PHOTOGRAPHIC PATTERN) | 0.120 | 0.240 | 0.500 | 1.000 | 1.300 | 1.400 |
| DIFFERENCE (PHOTOGRAPHIC PATTERN) | 0.020 | 0.040 | 0.150 | 0.250 | 0.250 | 0.200 |

LUT OF PHOTOGRAPHIC PATTERN IS FORMED BY THIS DENSITY INFORMATION

FIG. 6

| | P1 | P2 | P3 | P4 | P5 | P6 |
|---|---|---|---|---|---|---|
| A: INITIAL (PRINTING PATTERN) | 0.100 | 0.200 | 0.350 | 0.750 | 1.050 | 1.200 |
| B: PHOTOGRAPHIC PATTERN DIFFERENCE × 0.6 | 0.012 | 0.024 | 0.090 | 0.150 | 0.150 | 0.120 |
| A+B | 0.112 | 0.224 | 0.440 | 0.900 | 1.200 | 1.320 |

IMAGE FORMING APPARATUS AND IMAGE FORMING METHOD WHICH CONTROLS AN IMAGE FORMING CONDITION DEPENDING ON ONE TYPE OF IMAGE FORMING PATTERN

BACKGROUND OF THE INVENTION

1. Field of the Invention

The present invention relates to an image forming apparatus and image forming method of generating a desired image formation pattern by converting an input image signal.

2. Description of the Related Art

Generally, an electrophotographic system, particularly a color copying machine using color toners of a plurality of colors has a look-up table for converting an image signal into a signal value meeting the characteristics of the engine used, in order to obtain desired density gradation characteristics. A color copying machine has such look-up table for each of yellow, magenta, cyan, and black and can output a desired full-color image by individually optimizing these colors.

An electrophotographic image forming apparatus, however, readily changes its characteristics in accordance with, e.g., the surrounding environment and the use state, so it is difficult to constantly output images stable in the tone of color by using fixed look-up tables. Accordingly, conventional apparatuses of this sort include a development density detecting means for detecting the density of a developed image formed on a photosensitive drum or the like. On the basis of information of the density detected by this development density detecting means, look-up tables are newly formed or corrected so that desired gradation characteristics can be obtained.

A conventional image forming apparatus having this development density detecting means will be described below. FIG. 9 shows the overall arrangement of a conventional electrophotographic digital copying machine.

In this conventional digital copying machine shown in FIG. 9, a CCD 1 reads an image of an original 21, and an amplifier 2 amplifies the obtained analog image signal to a predetermined level. After that, an analog/digital converter (A/D converter) 3 converts the amplified signal into a digital image signal of, e.g., 8 bits (0 to 255 gray levels).

This digital image signal is supplied to a γ converter (e.g., a converter which is constructed of 256-byte data and converts density in a look-up table manner) 5 where the signal is γ-corrected. This digital image signal is again converted into an analog image signal and supplied to one input terminal of a comparator 11.

A triangular-wave signal of predetermined period generated by a triangular-wave generator 10 is supplied to the other input terminal of the comparator 11. The analog image signal supplied to one of the input terminals of the comparator 11 is compared with the triangular-wave signal of predetermined period generated by the triangular-wave generator 10, and is modulated in pulse width. This pulse-wave-modulated binary image signal is input to a laser driver 12 and used as an emission ON/OFF control signal of a laser diode 13.

A laser beam emitted from the laser diode 13 is scanned in a main scan direction by a well-known polygonal mirror 14 and irradiates a photosensitive drum 17, which is an image carrier rotating in an arrow direction, via an fθ lens 15 and a reflecting mirror 16, forming an electrostatic latent image.

This photosensitive drum 17 is evenly charged-removed by an exposing unit 18 and evenly charged, e.g., negatively, by a primary charger 19. After that, the photosensitive drum 17 is irradiated with the aforementioned laser beam to form an electrostatic latent image corresponding to the image signal. A developing unit 20 develops this electrostatic latent image into a visual image (toner image).

During the development, an AC bias component is superposed on the developing unit to improve the DC bias component and development efficiency meeting the electrostatic latent image formation conditions. This toner image is transferred, by the action of a transfer charger 22, on to a transfer medium 23 held on a transfer medium carrier belt 27 that stretches between two rollers 25 and 26 and is endlessly driven in an arrow direction.

The residual toner on the photosensitive drum 17 is scraped off and collected by a cleaner 24 later. For the sake of simplicity, FIG. 9 shows only a single image forming station (including the photosensitive drum 17, the exposing unit 18, the primary charger 19, the developing unit 20, and the like). In the case of a color image forming apparatus, however, image forming stations corresponding to yellow, magenta, cyan, and black are arranged above the transfer medium carrier belt 27 along its moving direction. Alternatively, developing units of yellow, magenta, cyan, and black are placed in a rotatable housing, and a desired developing unit is opposed to the photosensitive drum 17 to develop a desired color.

When the development by the developing unit 20 progresses, the toner amount in the developing unit 20 reduces, so no desired density can be secured any longer. Therefore, a video counter 4 is used to extract by analogy the use amount of toner from the image formation pattern.

A CPU 6 stores the toner use amount extracted by the video counter 4 into a RAM 6a. In the case of a color image forming apparatus, the CPU 6 adds up the use amounts of toner of each color. When a predetermined use amount is reached, the CPU 6 activates a toner supply driver 7 and rotates a toner supply motor 28 to drive a toner supply mechanism 30, thereby supplying toner 29 in a toner cartridge 8 into a predetermined developing unit 20. Reference numeral 21 denotes toner supplied into the developing unit.

Not only for copying machines, several halftoning methods (image processing patterns) of gradation reproduction methods can be used. So-called multi-valued reproduction reproduces gradation in units of dots by using a triangular wave described previously. So-called binary reproduction reproduces gradation by forming a plurality of dot matrices at two values: a dot is formed and a dot is not formed. In another method, a matrix is formed by multiple values. An optimum one is chosen from these methods in accordance with the type (e.g., a printed original, a character original, or an image signal from a controller) of input image.

In any method, desired gradation characteristics can be secured only when the toner supply amount in the developing unit 20 is controlled to a desired amount. To control this toner supply amount, the conventional approach is to detect the density of a patch-like toner image (to be referred to as a "gradation control patch" hereinafter) obtained by developing an electrostatic latent image formed by a gradation control image signal. That is, this gradation control patch is irradiated with light from a light source such as an LED, the reflected light is received by a built-in photoelectric element, and the output value is converted into density. In accordance with information of the detected density signal, look-up tables are newly formed or corrected. In this manner, the toner supply amount in the developing unit 20 is controlled to maintain desired gradation characteristics.

Some conventional apparatuses, however, obtain gradation characteristics by using various image processing patterns for one printer engine. If this is the case, it is necessary to form gradation control patches for the individual image processing patterns, measure the respective density characteristics, and form look-up tables and the like on the basis of the measurement results. This is very time-consuming and inconvenient.

SUMMARY OF THE INVENTION

The present invention has been made in consideration of the above situation, and has as its object to provide an apparatus capable of predicting density information of one image processing pattern from density information of a gradation control patch of another image processing pattern, thereby reducing the control time by one-half compared with gradation control using two different image processing patterns.

It is another object of the present invention to provide an apparatus capable of predicting density information of one image processing pattern from density information of another image processing pattern and performing optimum gradation control on the basis of the density information, thereby reducing the control time and improving the convenience.

As one means for achieving these objects, the present invention includes the following arrangement.

An image forming apparatus is characterized by comprising image processing means for generating a desired image formation pattern, latent image forming means for forming, on an image carrier, an electrostatic latent image corresponding to the image formation pattern generated by the image processing means, developing means for developing, with toner, the electrostatic latent image formed by the latent image forming means, development density detecting means for detecting density of a developed image developed by the developing means, gradation control means for controlling latent image formation conditions in accordance with a development density signal detected by the development density detecting means, and control means for controlling the latent image forming means by correcting the latent image forming means, on the basis of a development density signal detected by the development density detecting means for a developed image corresponding to a specific image formation pattern formed by the image generating means, such that the latent image forming means is optimum for another image formation pattern.

For example, the image forming apparatus is characterized in that the development density detecting means detects density of a developed image formed by the developing means for an electrostatic latent image formed in accordance with a density control image signal previously determined by the latent image forming means.

For example, the image forming apparatus is characterized in that the gradation control means includes a look-up table for correcting an input image signal, and the control means controls the latent image formation conditions by changing the look-up table in accordance with the development density signal detected by the development density detecting means.

For example, the image forming apparatus is characterized in that the image processing means generates a desired image formation pattern by processing input electronic image information. The image forming apparatus is characterized in that the electronic image information is an original image obtained by reading an original, or an input image from an external device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a table showing the detection results of patch densities when gradation control patches are formed by using a photographic pattern in this embodiment;

FIG. 6 is a table showing pieces of density information of gradation control patches after endurance in this embodiment;

DETAILED DESCRIPTION OF THE PREFERRED EMBODIMENTS

The arrangement of one embodiment according to the present invention will be described in detail below with reference to the accompanying drawings. In the following description, the present invention is applied to an image forming apparatus of electrophotographic type, electrostatic recording type, or the like.

First Embodiment

Figure 1:
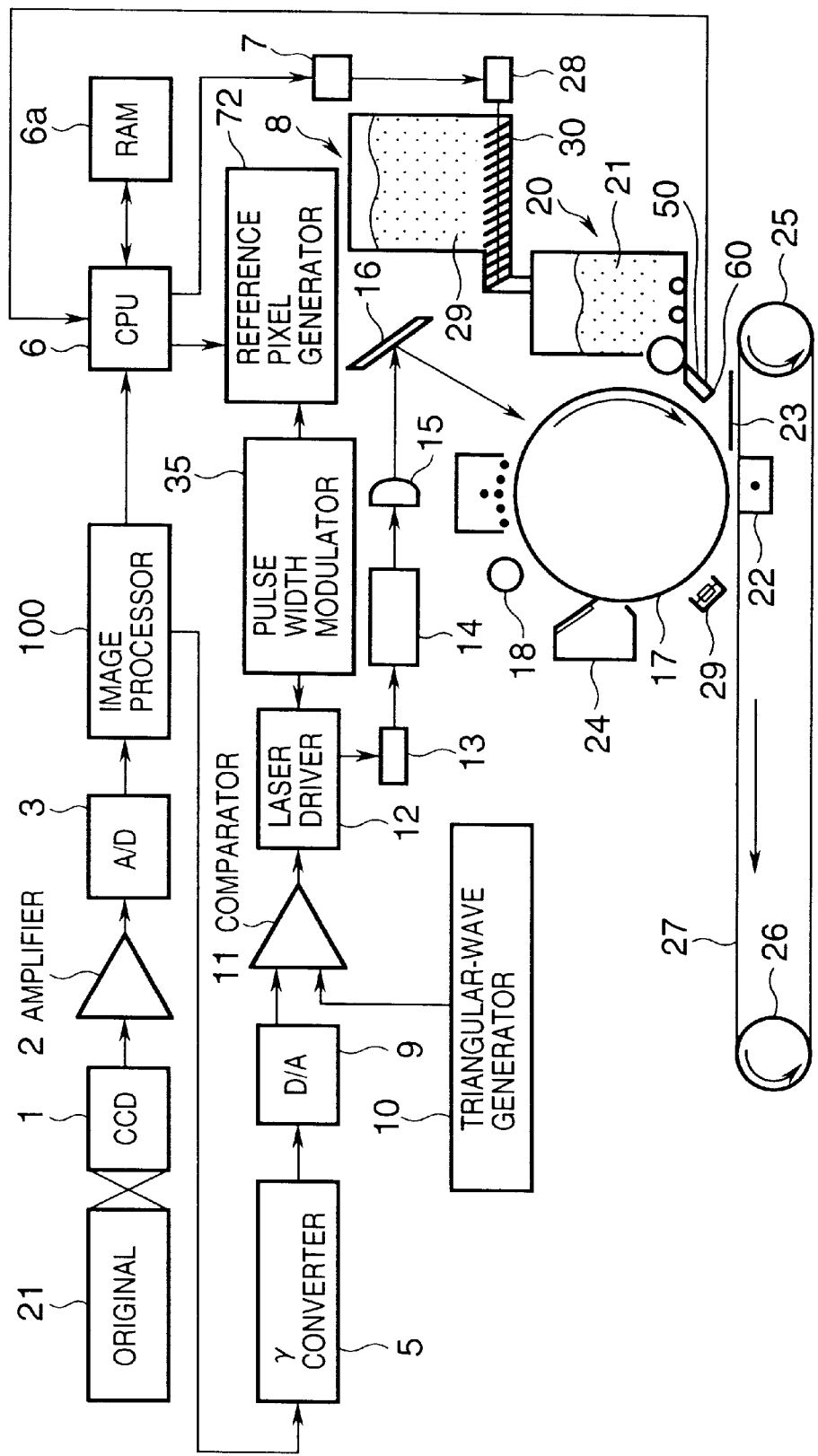
FIG. 1 is a view showing an outline of the arrangement of an image forming apparatus in one embodiment according to the present invention.

FIG. 1 is a view showing an outline of the arrangement of an image forming apparatus in the first embodiment according to the present invention. An image forming apparatus to which this embodiment is applicable can be any apparatus provided that a latent image corresponding to an image information signal is formed on an image carrier, such as a photosensitive member or a dielectric member, by an electrophotographic scheme, an electrostatic recording scheme, or the like, this latent image is developed by a developing unit to form a visual image (toner image), and this visual image is transferred, either directly or indirectly, onto a transfer medium and fixed to form a permanent image by a fixing means.

Figure 9:
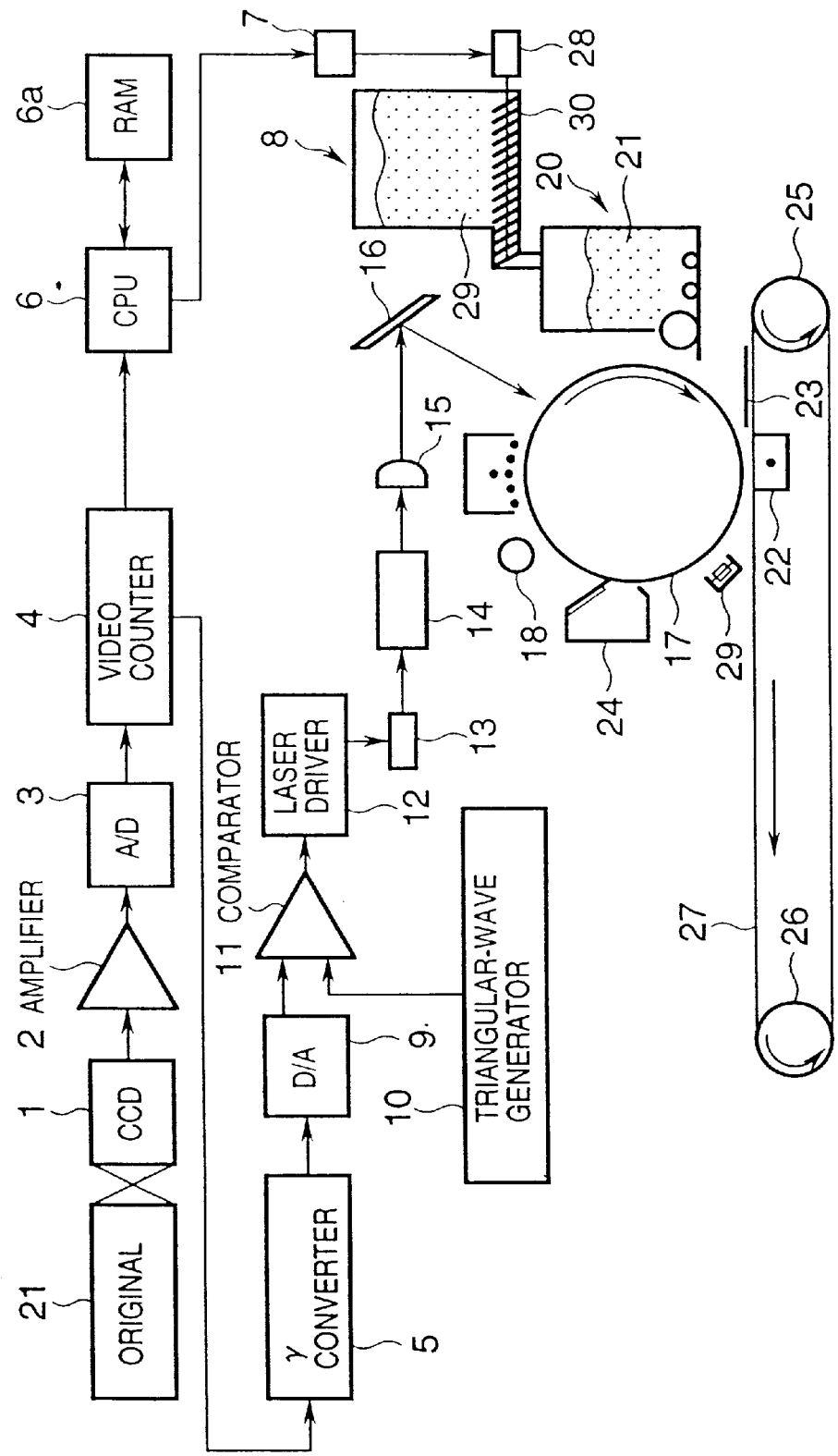
FIG. 9 is a view showing the overall arrangement of one conventional image forming apparatus.

First, the overall arrangement of the image forming apparatus of this embodiment will be described below with reference to FIG. 1. In FIG. 1, the same reference numerals as in the conventional apparatus shown in FIG. 9 denote the same parts, and a detailed description thereof will be omitted.

An image of an original 21 to be copied is formed on a CCD 1 by an image forming lens (not shown) and read by the CCD 1. The CCD 1 decomposes the image into a large number of pixels and generates an analog photoelectric conversion signal (analog image signal) corresponding to the density of each pixel. The output analog photoelectric conversion signal is supplied to an amplifier 2 where the signal is amplified to a predetermined level.

An analog/digital converter (A/D converter) 3 converts this analog photoelectric conversion signal amplified to the predetermined level into a corresponding digital image signal of, e.g., 8 bits (0 to 255 gray levels). The converted digital image signal is supplied to an image processor 100 where the signal is converted into an optimum image processing pattern.

When an original is a photographic original, the image processor 100 of this embodiment converts the image into an image processing pattern (photographic pattern) which has 256 gray levels per dot, i.e., which is multi-valued, and which has a resolution of 200 dpi. When an original is a character original or a printed original, the image processor 100 converts the image into an image processing pattern (printing pattern) which has two gray levels per dot, i.e., which is binary, and which has a resolution of 600 dpi. That is, the image processor 100 of this embodiment can process both halftone images and binary images.

The digital image signal converted into a desired image processing pattern by the image processor 100 is supplied to an optimized γ converter (in this embodiment, a converter which is constructed of 256-byte data for each color and converts density in a look-up table manner) 5. After being γ-corrected by the γ converter 5, the digital image signal is input to a digital/analog converter (D/A converter) 9.

The digital image signal is again converted into a corresponding analog image signal by the D/A converter 9 and supplied to one input terminal of a comparator 11. A triangular-wave signal of predetermined period generated by a triangular-wave generator 10 is supplied to the other input terminal of the comparator 11. The analog image signal supplied to one of the input terminals of the comparator 11 is compared with this triangular-wave signal and modulated in pulse width.

This pulse-width-modulated signal is formed into a laser driving pulse signal having a width (time length) corresponding to the level of each pixel image signal. The comparator 11 forms and outputs this laser driving pulse signal.

When the image processing pattern is a binary pattern, only a maximum value (level 256) and a minimum value (level 0) of the pulse-width-modulated signal are used. This pulse-width-modulated laser ON/OFF binary image signal is input to a laser driver and used as an emission ON/OFF control signal of a laser diode 13.

The formed laser driving pulse is supplied to the semiconductor laser 13 and makes this semiconductor laser 13 emit light for a time corresponding to the pulse width.

The laser beam emitted from the semiconductor laser 13 is scanned in a main scan direction by a well-known polygonal mirror 14 and irradiates a photosensitive drum 17, which is an image carrier rotating in an arrow direction, via an fθ lens 15 and a reflecting mirror 16, forming an electrostatic latent image.

This photosensitive drum 17 is evenly charged-removed by an exposing unit 18 and evenly charged, e.g., negatively, by a primary charger 19. After that, the photosensitive drum 17 is irradiated with the aforementioned laser beam to form an electrostatic latent image corresponding to the image signal. A developing unit 20 develops this electrostatic latent image into a visual image (toner image).

During the development, an AC bias component is superposed on the developing unit to improve the DC bias component and development efficiency meeting the electrostatic latent image formation conditions. This toner image is transferred, by the action of a transfer charger 22, onto a transfer medium 23 held on a transfer medium carrier belt 27 that stretches between two rollers 25 and 26 and is endlessly driven in an arrow direction. The residual toner on the photosensitive drum 17 is scraped off and collected by a cleaner 24 later.

Furthermore, in this embodiment, to correct the toner density that has changed in the developing unit 20 by the development, the density of a patch-like toner image (to be referred to as a "development density control patch" hereinafter) 60 obtained by developing an electrostatic latent image formed by a development density control image signal is detected. That is, this development density control patch is irradiated with light from a light source such as a built-in LED of a toner density sensor 50, the reflected light is received by a built-in photoelectric element of the toner density sensor 50, and the output value is converted into density and detected. In accordance with a conversion table of predetermined detection densities and necessary toner replenishing amounts, toner is replenished into the developing unit 20.

In electrophotographic image forming apparatuses, the γ characteristic of image density changes owing to the surrounding environment, the number of copies, and the like. Especially in a color image, this change appears as a change in the tone of color or a gradation variation in a highlighted portion, making image formation unstable.

In this embodiment, therefore, a gradation control patch for gradation control is formed. In accordance with detected density information of this gradation control patch, a look-up table (to be referred to as an "LUT" hereinafter) of the γ converter is again formed. γ correction is performed on the basis of this LUT to maintain desired gradation characteristics.

The patch described above is an electrostatic latent image of a detection mark formed on the photosensitive drum 17 as an electrostatic latent image carrier. This electrostatic latent image (patch) is formed, the patch latent image is developed with a toner component, and development density information of the toner color is detected from the patch development. On the basis of this detected density information, an LUT of the γ converter is again formed.

For the sake of simplicity, FIG. 1 shows only a single image forming station (including the photosensitive drum 17, the exposing unit 18, the primary charger 19, the developing unit 20, and the like). In the case of a color image forming apparatus, however, image forming stations corresponding to yellow, magenta, cyan, and black are arranged above the transfer medium carrier belt 27 along its moving direction. Alternatively, developing units of yellow, magenta, cyan, and black are placed in a rotatable housing, and a desired developing unit is opposed to the photosensitive drum 17 to develop a desired color. These arrangements are, of course, included in this embodiment.

A method of detecting the density of a patch formed on the photosensitive drum 17 in gradation control of this embodiment will be described below.

For example, a reference image generator 72 for generating a reference image signal having a signal level corresponding to a predetermined density controlled by the CPU 6 and a pulse width modulator 35 are provided. This reference image generator 72 supplies the reference image signal to the pulse width modulator 35 to generate a laser driving pulse having a pulse width corresponding to the predetermined density. This laser driving pulse is supplied to the laser driver 12 to cause the semiconductor laser 13 to emit light only for a time corresponding to the pulse width, thereby scanning the photosensitive drum 17.

In this manner, a reference electrostatic latent image corresponding to the predetermined density is formed on the photosensitive drum 17 and developed by the developing unit 20. The patch-like reference toner image thus obtained is irradiated with light from a light source such as the built-in LED of the toner density sensor 50, and the reflected light is received by the built-in photoelectric converting element.

Figure 2:
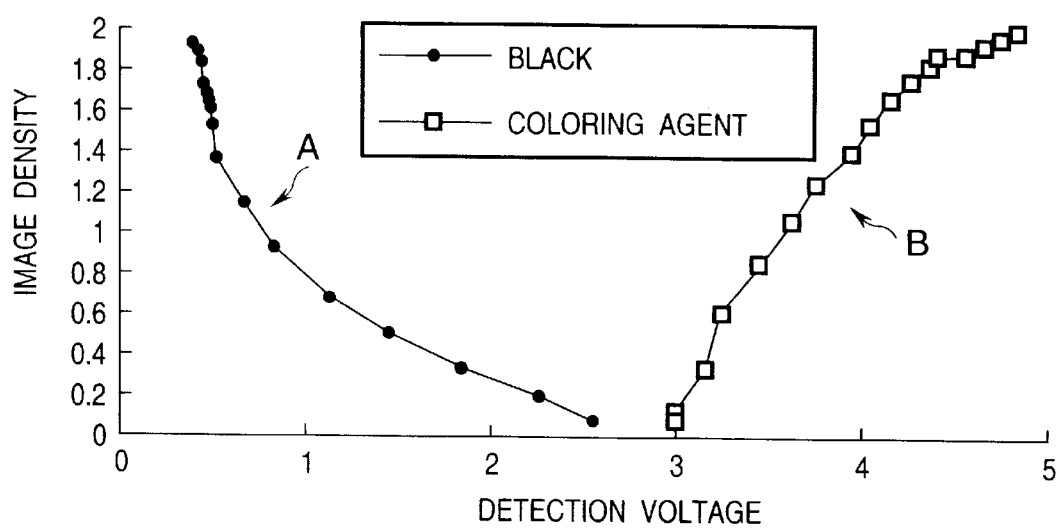
FIG. 2 is a graph showing changes in image densities as a function of the detection voltage of a photoelectric converting element in this embodiment.

The output signal from the built-in photoelectric converting element of this toner density sensor can be related to the density of the reference toner image (patch toner image) in accordance with a conversion form obtained by a graph, shown in FIG. 2, indicating the relationship between the output voltage (sensor output voltage) and the image density.

The image forming apparatus in this embodiment includes a mode for forming a toner image of a gradation control patch composed of a plurality of reference toner image patches for using the conversion form shown in FIG. 2.

In gradation control of this embodiment, in the gradation control patch toner image formation mode a photoelectric converting element 74 detects the toner image density of a gradation control patch formed on the photosensitive drum 17. On the basis of the development density characteristic curve of the detected reference toner image, the internal LUT of the γ converter 5 is rewritten to maintain the initial gradation characteristics.

Figure 3:
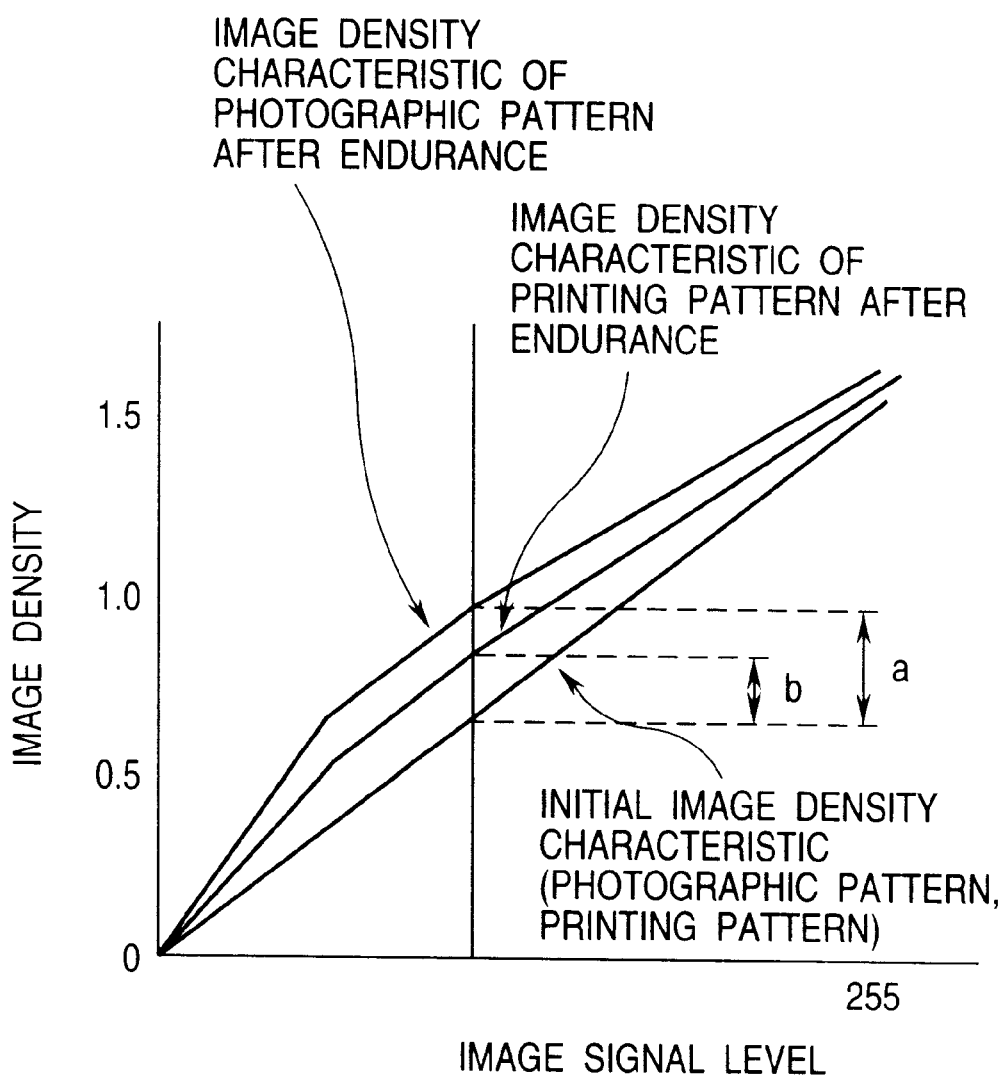
FIG. 3 is a graph schematically showing differences between image density characteristics due to characteristic image processing patterns in this embodiment.

Examples of image density characteristics output on the basis of the LUT in this embodiment will be described below with reference to FIG. 3. FIG. 3 is a graph schematically showing differences between image density characteristics due to characteristic image processing patterns in this embodiment.

As shown in FIG. 3, the lowermost image density characteristic that is output on the basis of an LUT formed in accordance with the initial state significantly deviates from the initial density characteristic as the number of copies increases (to be referred to as "after endurance" hereinafter). In an actual image, this deviation is recognized as, e.g., a change in the tone of color by an observer.

For example, the image density characteristic of a printing pattern after endurance is the middle characteristic shown in FIG. 3. The image density characteristic of a photographic pattern after endurance is the uppermost characteristic shown in FIG. 3.

As shown in FIG. 3, the density variation (b) of the printing pattern is 0.6 times (b/a) the density variation (a) of the photographic pattern. Experiments confirmed that this relationship exhibits substantially the same value even when the change is caused by some other image density characteristic change factor such as a surrounding environmental change.

Accordingly, when an LUT is formed on the basis of density information of a gradation control patch during endurance, an LUT of one image processing pattern can be formed on the basis of information of an LUT formed by another image processing pattern.

In the image forming apparatus of this embodiment, a gradation control patch is formed by a photographic pattern on the basis of the aforementioned experimentally confirmed facts. On the basis of this density signal value, an LUT for the photographic pattern is formed. Also, a difference from the initial characteristic of the photographic pattern is multiplied by 0.6 to obtain a change amount of a printing pattern. An LUT for the printing pattern is formed from this value.

The process of forming a printing pattern LUT in this embodiment will be described in detail below.

Figure 4:
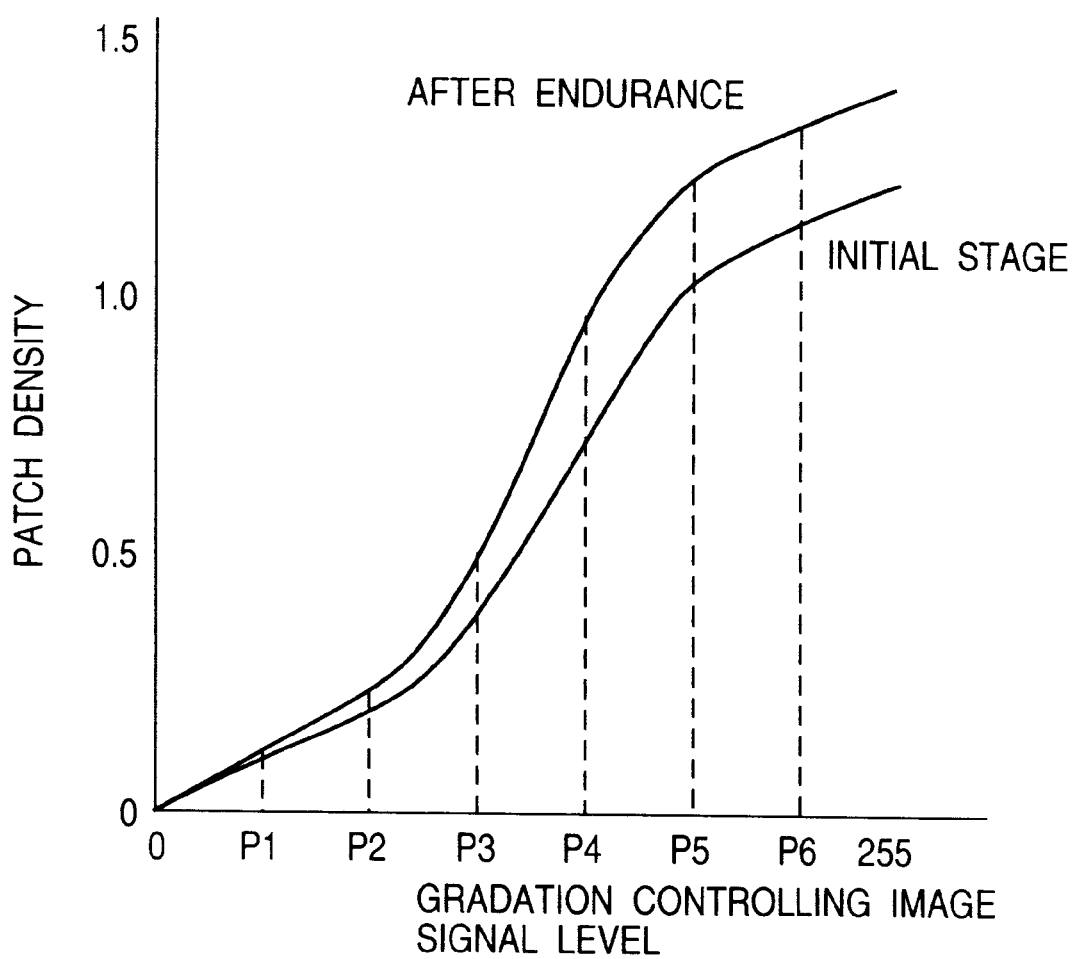
FIG. 4 is a graph schematically showing the way the density changes when a gradation control patch is formed by using a photographic pattern in this embodiment.

FIG. 4 schematically shows the patch densities when gradation control patches (P1 to P6) are formed using a photographic pattern.

When the density of each patch equals the detection result shown in FIG. 5, a photographic pattern LUT is first formed on the basis of this density information. FIG. 5 is a table showing the patch density detection results when the gradation control patches (P1 to P6) are formed using a photographic pattern in this embodiment. FIG. 4 schematically represents patch densities corresponding to the detection results.

Meanwhile, the differential value from the photographic pattern is multiplied by 0.6, the product is added to the initial patch density of a printing pattern (a column A+B in FIG. 6), and the sum is used as density information of a gradation control patch after endurance. On the basis of this information, a printing pattern LUT is formed. Examples of gradation control patch density information after endurance are shown in FIG. 6. FIG. 6 is a table showing examples of gradation control patch density information after endurance.

That is, the above arithmetic operations are performed in accordance with each patch density shown in FIG. 5 to obtain the pieces of density information after endurance shown in FIG. 6.

When an image forming apparatus is of full-color type, the same processing is performed for each color.

Figure 7:
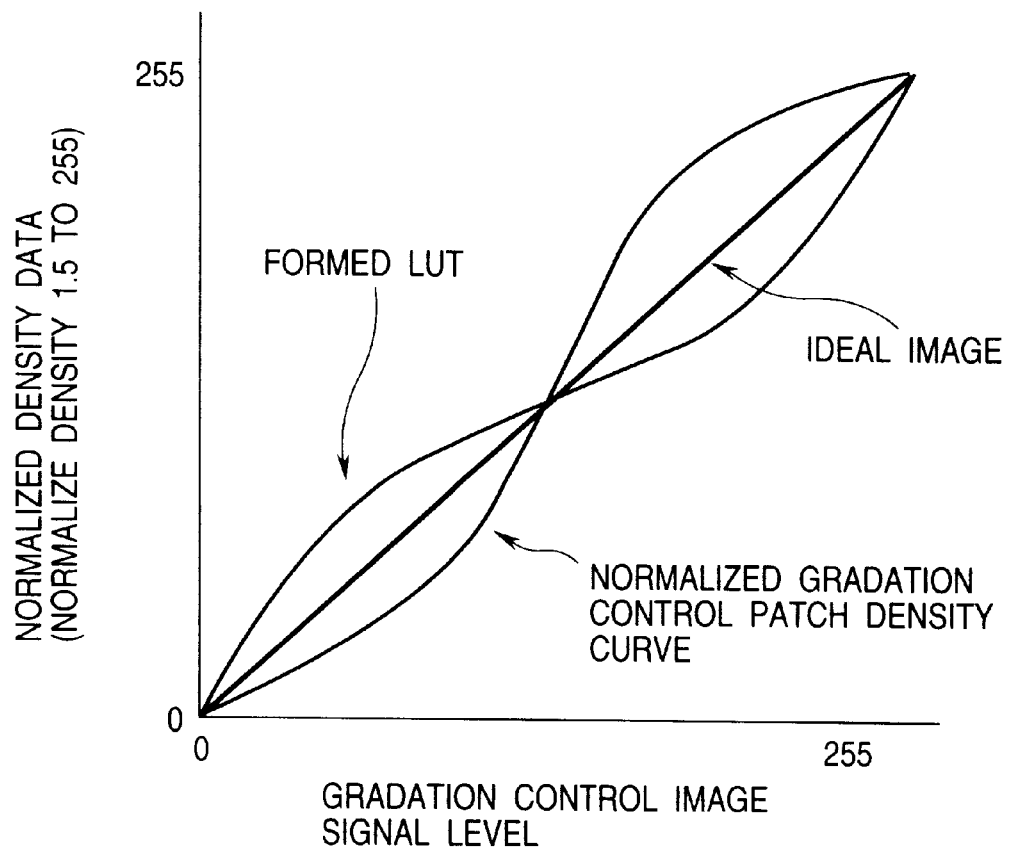
FIG. 7 is a graph schematically showing the look-up table characteristics with respect to the image density characteristics in this embodiment.

In this embodiment, an LUT is so formed as to have linear gradation for an image signal, and a desired gradation characteristic is obtained. That is, as shown in FIG. 7, an LUT having a desired characteristic is obtained by inverting normalized density data axially symmetrically with respect to an ideal density characteristic line.

In this embodiment as described above, density information of one image processing pattern is predicted from density information of a gradation control patch of another image processing pattern. Consequently, the control time can be reduced by half compared with gradation control using two different image processing patterns.

Also, in this embodiment gradation control is performed using 6-level patches (P1 to P6). However, the number of patches is, of course, not limited to this number. So, gradation control can be performed using patches of arbitrary levels.

Second Embodiment

In the above first embodiment, LUTs corresponding to individual original types are formed by changing image processing patterns in accordance with the types of originals, and these LUTs are selectively used in accordance with the types of originals. However, the present invention is not restricted to the above embodiment. For example, images can also be formed by image signals from an external device (to be referred to as a "controller" hereinafter). The second embodiment according to the present invention which can form images by image signals from this controller, in addition to having the arrangement that can change LUTs in accordance with the types of originals, will be described below.

Figure 8:
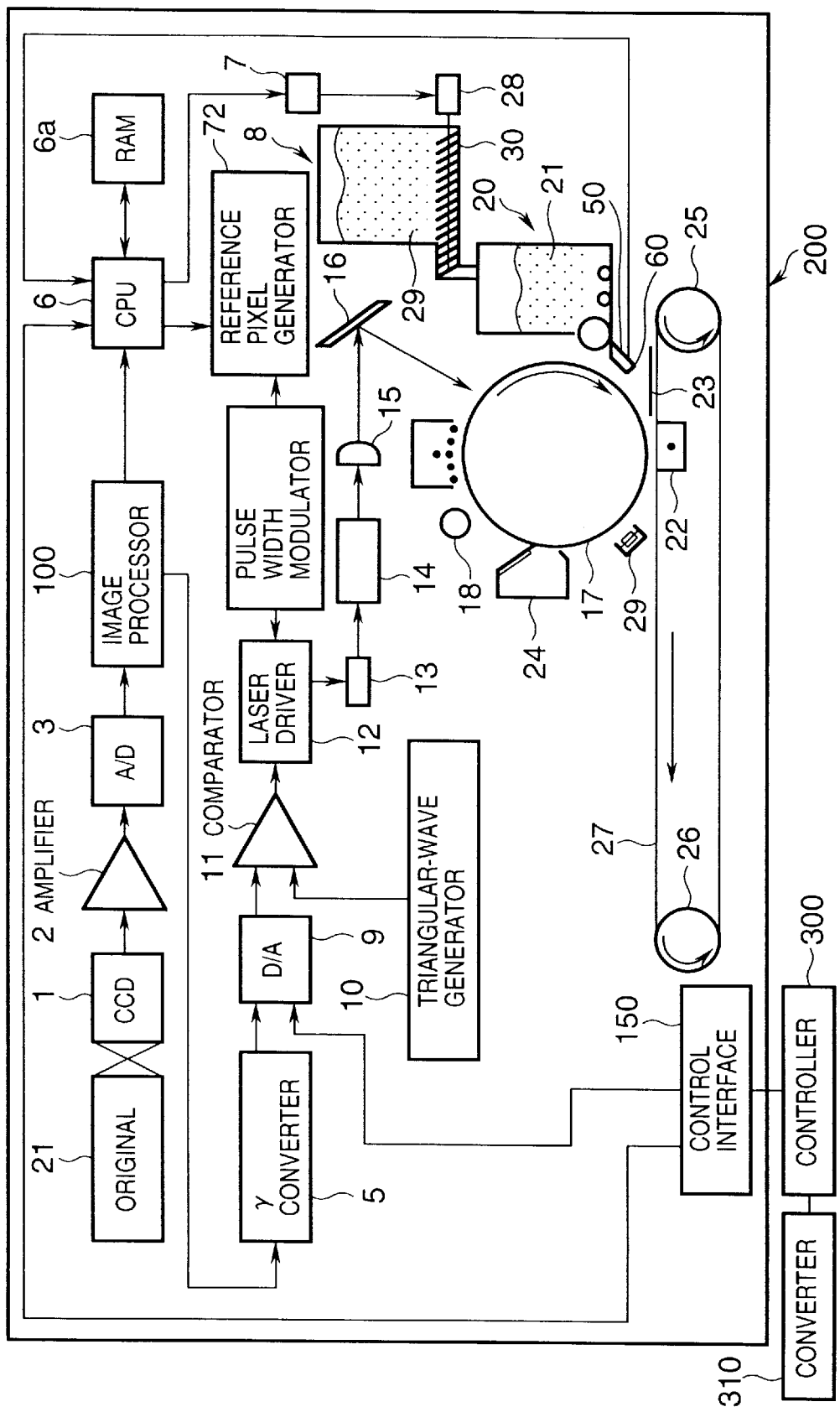
FIG. 8 is a view showing an outline of the arrangement of an image forming apparatus in the second embodiment according to the present invention.

FIG. 8 is a view showing an outline of the arrangement of an image forming apparatus of the second embodiment according to the present invention. The basic arrangement of this second embodiment is the same as the first embodiment. The same reference numerals as in the first embodiment denote the same parts, and a detailed description thereof will be omitted.

An image forming apparatus 100 of the second embodiment includes a controller interface 150 for interfacing with a controller 300 as another output information supply device. The controller 300 and a CPU 6 or a digital/analog converter (D/A converter) 9 can exchange information with each other via the controller interface 150.

The controller 300 has a converter 310 for converting densities using a look-up table. The controller 300 transmits image data γ-corrected by this converter 310 to the image forming apparatus 100 of the second embodiment. This γ-corrected image data is input to the D/A converter 9 via the controller interface 150 of the image processing apparatus 100.

The digital image signal from the controller 300 is again converted into an analog image signal by the D/A converter 9 and supplied to one input terminal of a comparator 11. After that, an image is formed following the same procedure as in the first embodiment.

When a photographic original is used, the image processing apparatus uses an image processing pattern (photographic pattern) which has 256 gray levels per dot, i.e., which is multi-valued, and which has a resolution of 200 dpi. When a character original or a printed original is used, the image processing apparatus uses an image processing pattern (printing pattern) which has two gray levels per dot, i.e., which is binary, and which has a resolution of 600 dpi.

The image processing pattern from the controller 300 is, e.g., the same image processing pattern which has 256 gray levels per dot, i.e., which is multi-valued, and which has a resolution of 200 dpi as the photographic pattern.

In the second embodiment, the image processing pattern from the controller 300 is the same as the photographic pattern. In the controller 300, a look-up table is so optimized that desired optimum image characteristics are obtained.

As an example, the rise of density from highlight is slightly delayed to optimize the visual expression on the highlight side. This is to make the output from the controller 300 look more attractive, whereas the gradation characteristics of a copying machine are so set as to reproduce originals as faithfully as possible.

Since this look-up table optimization is performed by an image processing arithmetic operation unit (not shown) of the controller 300, the patch density information from the image processing apparatus 100 is supplied to the controller 300 via the CPU 6. This is done only by transmitting a photographic pattern patch toner density signal to the controller 300 to make it process the signal.

Accordingly, even in the image processing pattern including the controller 300, pieces of density information corresponding to three different image processing activities can be provided by density information of one image processing pattern as in the first embodiment.

In the second embodiment, the controller image processing pattern is the same as the photographic pattern. However, an image processing pattern other than those used in copying machines can naturally be used in the controller 300 provided that the pattern has an optimum differential value ratio for the controller.

In the first and second embodiments as described above, when various image processing patterns exist for one printer engine, density information of one image processing pattern is predicted from density information of another image processing pattern, whereas a gradation control patch is conventionally formed using each corresponding image processing pattern. Consequently, it is possible to perform optimum gradation control by using this density information, reduce the control time, and improve the convenience.

Other Embodiments

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the embodiments, and the storage medium storing the program codes constitutes the invention.

Further, as the storage medium for providing the program codes, it is possible to use, e.g., a floppy disk, hard disk, optical disk, magnetooptical disk, CD-ROM, CD-R, magnetic tape, nonvolatile.memory card, and ROM.

Furthermore, besides aforesaid functions according to the above embodiments are realized by executing the program codes which are read by a computer, the present invention includes a case where an OS (Operating System) or the like running on the computer performs a part or the whole of actual processing in accordance with designations by the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or the whole of actual processing in accordance with designations of the program codes and realizes functions of the above embodiments.

When the present invention is applied to the above storage medium, this storage medium stores program codes corresponding to the aforementioned flow chart.

In the present invention as has been described above, on the basis of a development density signal detected by development density detecting means for a developed image corresponding to a specific image formation pattern formed by image processing means, latent image forming means is controlled by correction to be optimum for another image formation pattern. Consequently, the control time can be reduced. For example, the control time can be reduced by half compared with gradation control using two different image processing patterns.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   condition setting means for setting a condition for image formation;
   image forming means for forming an image;
   detection means for detecting density of the image formed by said image forming means; and
   correction means for correcting the condition set by said condition setting means on a basis of a detected result by said detection means,
      wherein said apparatus has a first image forming mode for forming an image using image forming patterns of a first type and a second image forming mode for forming an image using image forming patterns of a second type, and
      wherein said condition setting means sets the condition for image formation to a first condition in the first image forming mode and sets the condition for image formation to a second condition that is different from the first condition in the second image forming mode, and
      said correction means includes means for correcting the first condition on a basis of the detected result of the density of the image formed by using the image forming patterns of the first type and means for correcting the second condition on a basis of the detected result of the density of the image formed by using the image forming patterns of the first type.

2. The apparatus according to claim 1 further comprising conversion means for converting a density characteristic of an image signal,
   wherein said condition setting means sets a first conversion characteristic as the first condition in said conversion means in the first image forming mode and sets a second conversion characteristic as the second condition in said conversion means in the second image forming mode.

3. The apparatus according to claim 2, wherein said conversion means has memory means for storing the first and second conversion characteristics in a form of a look-up table.

4. The apparatus according to claim 1 further comprising image signal processing means for processing an image signal to form an image of the image forming patterns of the first or second type.

5. The apparatus according to claim 1, wherein said image forming means has means for forming a latent image on an image carrier and means for developing the latent image.

6. The apparatus according to claim 1, further comprising at least one of reading means for reading an original image and outputting an image signal corresponding to the original image, and input means for inputting an image signal from an external device.

7. The apparatus according to claim 1, wherein said image forming apparatus forms an image for correction by said correction means using the image forming patterns of the first type.

8. The apparatus according to claim 7, wherein the image for correction includes a plurality of patch images each having different densities.

9. The apparatus according to claim 1, wherein the first mode is suitable for a photographed image and the second mode is suitable for a character image.

10. The apparatus according to claim 1, wherein said image forming apparatus is capable of forming a color image.

11. An image forming method comprising:
    a condition setting step of setting a condition for image formation;
    an image forming step of forming an image;
    a detection step of detecting density of the image formed in said image forming step; and
    a correction step of correcting the condition set in said condition setting step on a basis of a detected result in said detection step,
       wherein said method has a first image forming mode for forming an image using image forming patterns of a first type and a second image forming mode for forming an image using image forming patterns of a second type, and
       wherein, in said condition setting step, the condition for image formation is set to a first condition in the first image forming mode and the condition for image formation is set to a second condition that is different from the first condition in the second image forming mode, and
       said correction step includes a step of correcting the first condition on a basis of the detected result of the density of the image formed by using the image forming patterns of the first type and a step of correcting the second condition on a basis of the detected result of the density of the image formed by using the image forming patterns of the first type.

12. The method according to claim 11 further comprising a conversion step of converting a density characteristic of an image signal,
    wherein, in said condition setting step, a first conversion characteristic is set as the first condition in said conversion step in the first image forming mode and a second conversion characteristic is set as the second condition in said conversion step in the second image forming mode.

13. The method according to claim 12, wherein said conversion step has a storing step of storing the first and second conversion characteristics in a form of a look-up table.

14. The method according to claim 11 further comprising an image signal processing step of processing an image signal to form an image of the image forming patterns of the first or second type.

15. The method according to claim 11, wherein said image forming step has a step for forming a latent image on an image carrier and a step of developing the latent image.

16. The method according to claim 11 further comprising at least one of a reading step of reading an original image and outputting an image signal corresponding to the original image, and an input step of inputting an image signal from an external device.

17. The method according to claim 11, wherein said image forming method forms an image for correction in said correction step using the image forming patterns of the first type.

18. The method according to claim 17, wherein the image for correction includes a plurality of patch images each having different densities.

19. The method according to claim 11, wherein the first mode is suitable for a photographed image and the second mode is suitable for a character image.

20. The method according to claim 11, wherein said image forming method is capable of forming a color image.

* * * * *

UNITED STATES PATENT AND TRADEMARK OFFICE
CERTIFICATE OF CORRECTION

PATENT NO. : 6,229,969 B1
DATED : May 8, 2001
INVENTOR(S) : Ohki

It is certified that error appears in the above-identified patent and that said Letters Patent is hereby corrected as shown below:

Title page,
Item [54], "IMAGE FORMING APPARATUS AND IMAGE FORMING METHOD WHICH CONTROLS AN IMAGE FORMING CONDITION DEPENDING ON ONE TYPE OF IMAGE FORMING PATTERN" should be -- IMAGE FORMING APPARATUS AND IMAGE FORMING METHOD --.

Column 2,
Line 12, "on to" should read -- onto --.

Column 10,
Line 34, "nonvolatile.memory" should read -- nonvolatile memory --.

Signed and Sealed this

Second Day of April, 2002

Attest:

JAMES E. ROGAN
*Attesting Officer*  *Director of the United States Patent and Trademark Office*